United States Patent
Toeniskoetter et al.

(10) Patent No.: US 8,127,423 B2
(45) Date of Patent: Mar. 6, 2012

(54) ROLLER HEMMING SYSTEM

(75) Inventors: James Toeniskoetter, Rochester Hills, MI (US); Jamie Lavely, Clarkston, MI (US)

(73) Assignee: Hirotec America, Inc., Auburn Hills, MI (US)

(*) Notice: Subject to any disclaimer, the term of this patent is extended or adjusted under 35 U.S.C. 154(b) by 792 days.

(21) Appl. No.: 12/286,917

(22) Filed: Oct. 3, 2008

(65) Prior Publication Data
US 2009/0089995 A1    Apr. 9, 2009

Related U.S. Application Data

(60) Provisional application No. 60/997,810, filed on Oct. 5, 2007.

(51) Int. Cl.
*B21D 39/00* (2006.01)
*B23P 11/00* (2006.01)

(52) U.S. Cl. ............ 29/509; 29/792; 29/796; 29/243.58

(58) Field of Classification Search .................... 29/422, 29/509, 788, 792, 796, 243.5, 243.57, 243.58, 29/283
See application file for complete search history.

(56) References Cited

U.S. PATENT DOCUMENTS

| | | | | |
|---|---|---|---|---|
| 5,228,190 | A * | 7/1993 | Sawa | 29/715 |
| 5,902,496 | A * | 5/1999 | Alborante | 219/86.24 |
| 6,112,390 | A * | 9/2000 | Takeda et al. | 29/33 K |
| 6,125,683 | A * | 10/2000 | Toeniskoetter | 72/426 |
| 6,421,893 | B1 * | 7/2002 | Katayama et al. | 29/33 K |
| 6,612,146 | B2 * | 9/2003 | Saint Denis et al. | 72/306 |
| 6,644,088 | B1 * | 11/2003 | Ruescher et al. | 72/312 |
| 7,134,309 | B2 * | 11/2006 | Toeniskoetter | 72/306 |
| 7,802,364 | B2 * | 9/2010 | Baulier | 29/897.2 |
| 2002/0131854 | A1 * | 9/2002 | Baulier | 414/749.1 |
| 2004/0056498 | A1 * | 3/2004 | Ghuman et al. | 296/1.01 |
| 2005/0044700 | A1 * | 3/2005 | Ghuman et al. | 29/791 |
| 2005/0086989 | A1 * | 4/2005 | Holmgren et al. | 72/220 |
| 2005/0217339 | A1 * | 10/2005 | Toeniskoetter | 72/220 |
| 2005/0229666 | A1 * | 10/2005 | Toeniskoetter | 72/220 |
| 2005/0262912 | A1 * | 12/2005 | Toeniskoetter | 72/220 |
| 2006/0053613 | A1 * | 3/2006 | Savoy | 29/430 |
| 2008/0302159 | A1 * | 12/2008 | Toeniskoetter et al. | 72/214 |

* cited by examiner

*Primary Examiner* — David Bryant
*Assistant Examiner* — Christopher Koehler
(74) *Attorney, Agent, or Firm* — Fildes & Outland, P.C.

(57) ABSTRACT

A roller hemming system for hemming nested panels includes a single hemming workstation providing for tooling exchange operations simultaneous with hemming operations. A plurality of robots that perform tooling exchange at the hemming workstation, movement of nested panels through the system, and hemming operations on nested panels at the hemming workstation. Nested panels are inputted into the system and hemmed nested panel assemblies are outputted from the system.

8 Claims, 5 Drawing Sheets

ROLLER HEMMING SYSTEM

CROSS REFERENCE TO RELATED APPLICATION

This application claims the priority of U.S. Provisional Application No. 60/997,810 filed Oct. 5, 2007.

TECHNICAL FIELD

This invention relates to a roller hemming system, and more particularly to a robotic roller hemming system that allows for a flexible product mix.

BACKGROUND OF THE INVENTION

It is known in the art relating to roller hemming that traditional roller hemming cells for large production volumes have multiple stations. In these conventional roller hemming cells, the hemming process is distributed over these multiple stations in order to support line rate or production throughput. Dividing the hemming across multiple stations increases the potential for dimensional variations in the final part product. When a flexible product mix is required, automation is added to the stations for tooling exchange. The tooling exchange is typically done by multiple slide mechanisms that are typically expensive and consume a substantial amount of floor space. Additionally, the tooling exchange automation negatively impacts production throughput due to the machine time required for tool exchange.

SUMMARY OF THE INVENTION

The present invention provides a roller hemming system that allows for the running of parts for multiple models at a line rate of 90 parts per hour with a batch of one model mix. In contrast to automation systems used in conventional roller hemming cells that move a fixture into and out of a work zone, the present invention utilizes robots to change out anvils and spiders, thereby increasing the line rate and flexibility of the present hemming process relative to conventional methods. The anvils are indexed to the hemming robot position by a turntable, which maximizes hemming robot processing time and reduces the overall robot quantity required.

The present system utilizes a robot having a robotic tool exchange mechanism that exchanges hemming anvils on a frame that is mounted on a turntable. A second robot carries a spider clamping device that mounts married inner and outer closure panels. The second robot presents the spider and mounted parts to the anvil mounted on the turntable frame. At this time, the spider is then secured to the anvil through a single low cost and compact clamping mechanism. The robot releases the spider assembly and then the spider transfer robot and the anvil transfer robot activate robot motion driven cornering units to bend the hem flange in the corner areas of the part. Cornering on the load side of the turntable increases available hem time in front of the hemming robots. Once the corners are bent, the first and second robots exit the anvil/spider load clearance zone, and the turntable rotates 180 degrees to present the closure panel for roller hemming. Multiple hemming robots, preferably three to five hemming robots, complete all outer periphery hemming. If required, additional roller hemming also may be performed on inside portions of the panels in areas such as glass channels on door sash portions. This additional roller hemming may be performed with a pull pressure roller head working from the opposite side of the closure panel.

The present system also allows for flexible change out, for both flexible production of multiple parts in a single line and for future model introduction into an existing production line. New/additional anvils and spiders can be introduced into the present hemming cell via exchange stands. Also, the anvils are designed so as to match the existing turntable frame in the hemming cell for easy integration into the hemming process.

More particularly, a roller hemming system in accordance with the present invention includes a single hemming workstation providing for tooling exchange operations simultaneous with hemming operations on nested panels. A plurality of robots perform tooling exchange at the hemming workstation, movement of nested panels through the system, and hemming operations on nested panels at the hemming workstation. Nested panels are inputted into the system and hemmed nested panel assemblies are outputted from the system.

In one embodiment, a roller hemming system for hemming nested panels includes a panel load robot that introduces nested panels into the system. A clamping spider load robot is adapted to interchangeably mount clamping spiders. The clamping spider load robot is cooperable with the panel load robot to transfer nested panels. A plurality of clamping spider storage stands are provided in combination with the clamping spider load robot. The clamping spider storage stands are disposed in proximity to and within reaching distance of the clamping spider load robot. Each clamping spider storage stand is adapted to store at least one clamping spider. An anvil load robot is adapted to interchangeably mount anvils. A plurality of anvil storage stands are provided in combination with the anvil load robot. The anvil storage stands are disposed in proximity to and within reaching distance of the anvil load robot. Each anvil storage stand is adapted to store at least one anvil. A turntable is disposed in proximity to and within reaching distance of the clamping spider load robot and the anvil load robot. The turntable is adapted to interchangeably support anvils, clamping spiders, and nested panels thereon. A plurality of roller hemming robots are disposed in proximity to and within reaching distance of the turntable to perform hemming operations on nested panels. An unload robot is cooperable with the clamping spider load robot. The unload robot receives hemmed nested panel assemblies from the clamping spider load robot and releases the hemmed nested panel assemblies from the system.

A roller hemming system in accordance with the present invention embodies a method of hemming nested panels. The method includes providing a single hemming workstation having a turntable adapted to simultaneously mount at least two anvils thereon at a first anvil mounting position and a second anvil mounting position. An anvil is mounted on the first anvil mounting position of the turntable using an anvil load robot. A clamping spider and an engaged set of nested panels is mounted on the anvil at the first anvil mounting position using a clamping spider load robot. The turntable is rotated to present the anvil and the mounted clamping spider and nested panels to a plurality of roller hemming robots. Hemming operations are performed on the nested panels using the roller hemming robots. While performing the hemming operations, at least one of the following steps is performed: (a) unloading a clamping spider and an engaged hemmed nested panel assembly from an anvil mounted on the second anvil mounting position of the turntable using the clamping spider load robot, (b) unloading an anvil from the second anvil mounting position using the anvil load robot, (c) mounting an anvil on the second anvil mounting position using the anvil load robot, and (d) mounting a clamping spider and an engaged set of nested panels onto an anvil disposed at the second anvil mounting position using the clamping spider load robot.

Hemming operations may be simultaneously performed from a front side and a back side of the nested panels.

At least one anvil may be stored on at least one anvil storage stand disposed in proximity to and within reaching distance of the anvil load robot. At least one clamping spider may be stored on at least one clamping spider storage stand disposed in proximity to and within reaching distance of the clamping spider load robot.

A set of nested panels may be loaded onto the clamping spider held by the clamping spider load robot using a panel load robot that engages the nested panels and presents the nested panels to the clamping spider load robot, wherein the nested panels are mounted on the clamping spider and released from the panel load robot. A hemmed nested panel assembly may be unloaded from a clamping spider mounted on the clamping spider load robot using an unload robot, wherein the clamping spider load robot presents the hemmed nested panel assembly to the unload robot, the unload robot engages the hemmed nested panel assembly, and the clamping spider load robot releases the hemmed nested panel assembly.

The unload robot may manipulate the hemmed nested panel assembly relative to a pedestal mounted roller hemming head to perform localized hemming operations. Cornering may be performed on the load side of the turntable before rotating the turntable to present the panels for hemming.

These and other features and advantages of the invention will be more fully understood from the following detailed description of the invention taken together with the accompanying drawings.

DETAILED DESCRIPTION OF THE INVENTION

Figure 1:
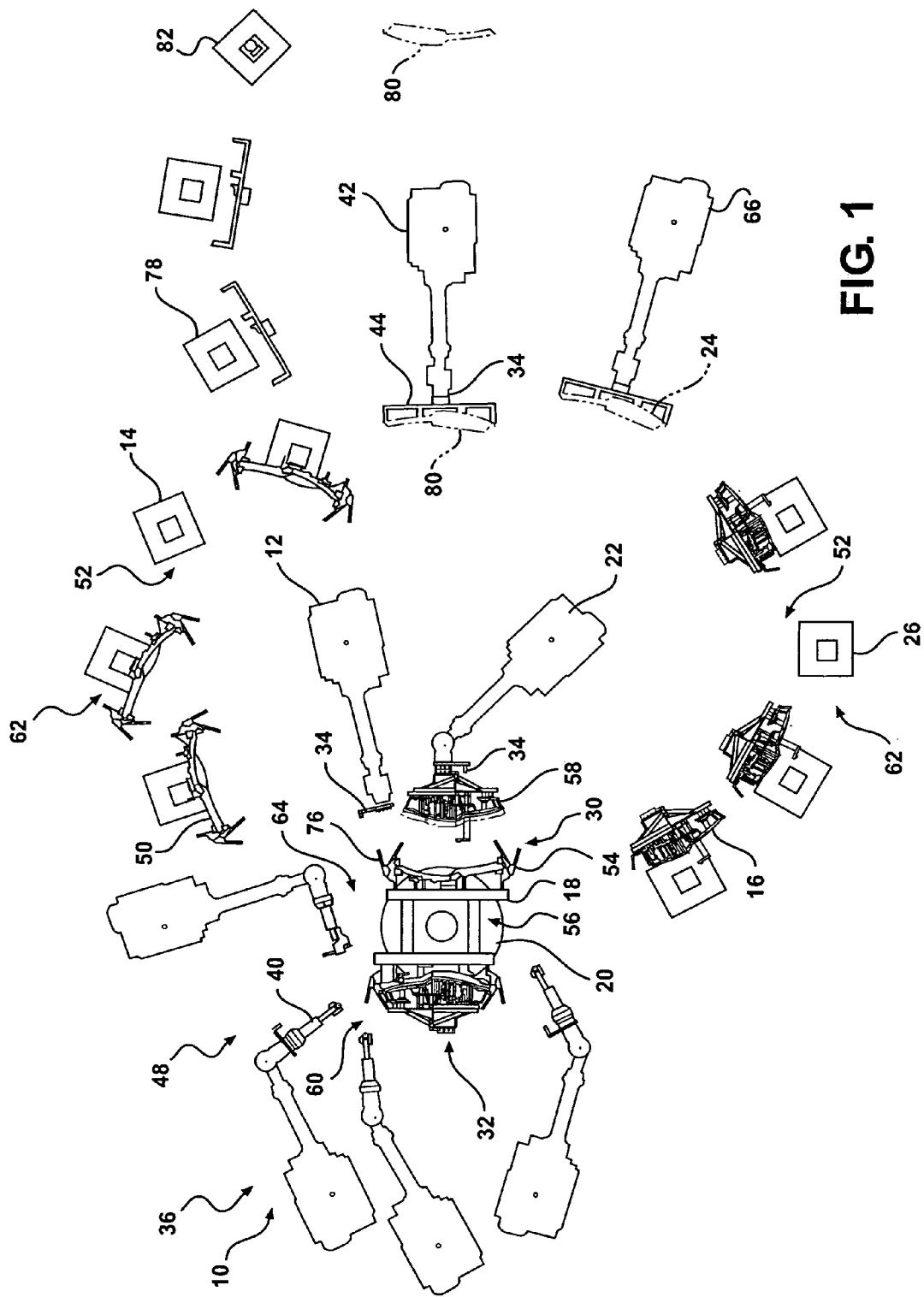
FIG. 1 is a schematic view of a roller hemming system embodying the method in accordance with the invention.
Figure 2:
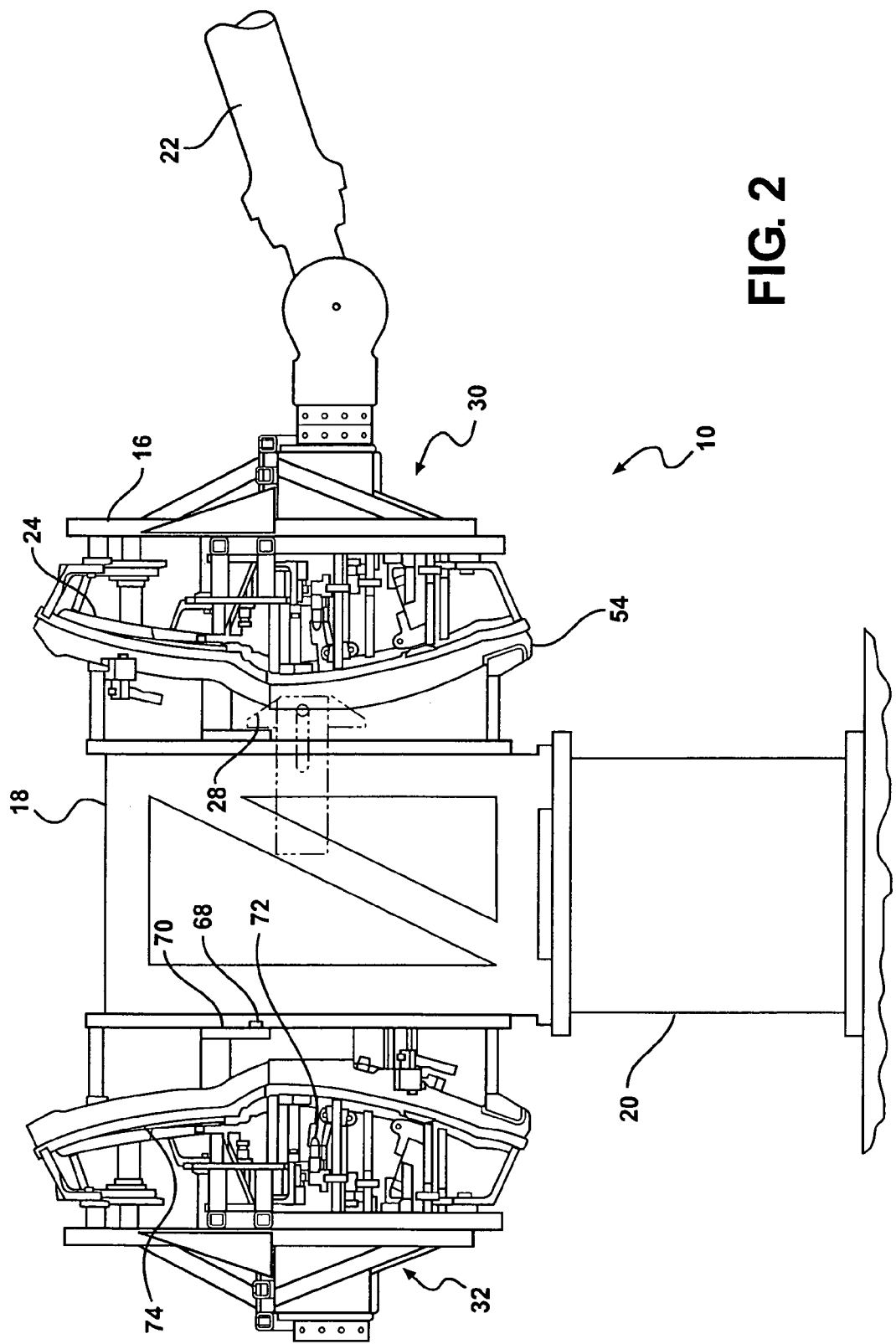
FIG. 2 is a side view of a turntable on which an anvil, clamping spider, and nested metal panels are mounted.
Figure 3:
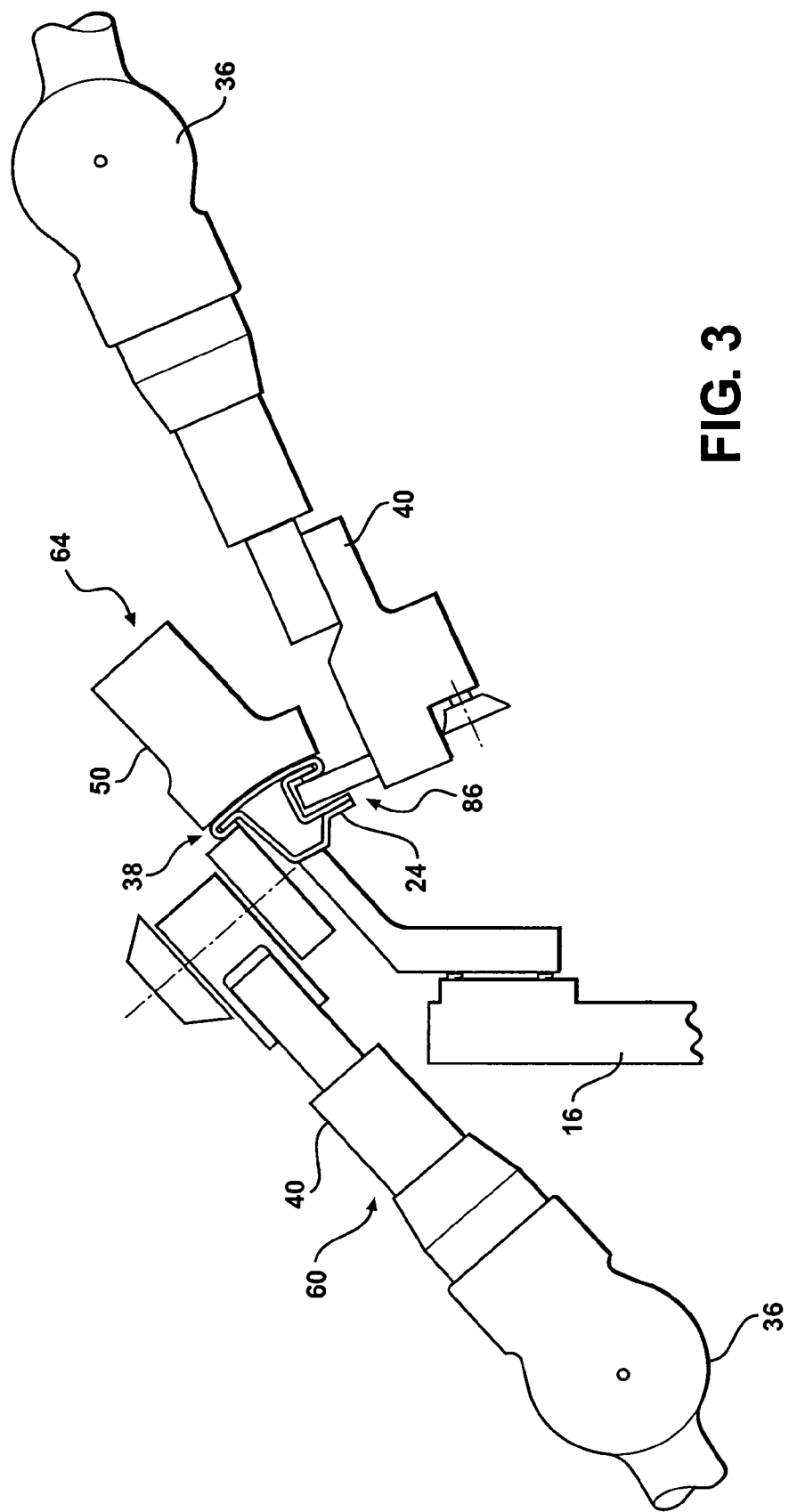
FIG. 3 is a perspective view of nested metal panels clamped to an anvil by a clamping spider, and a plurality of roller hemming robots simultaneously performing hemming operations from front and back sides of the nested metal panels.
Figure 4:
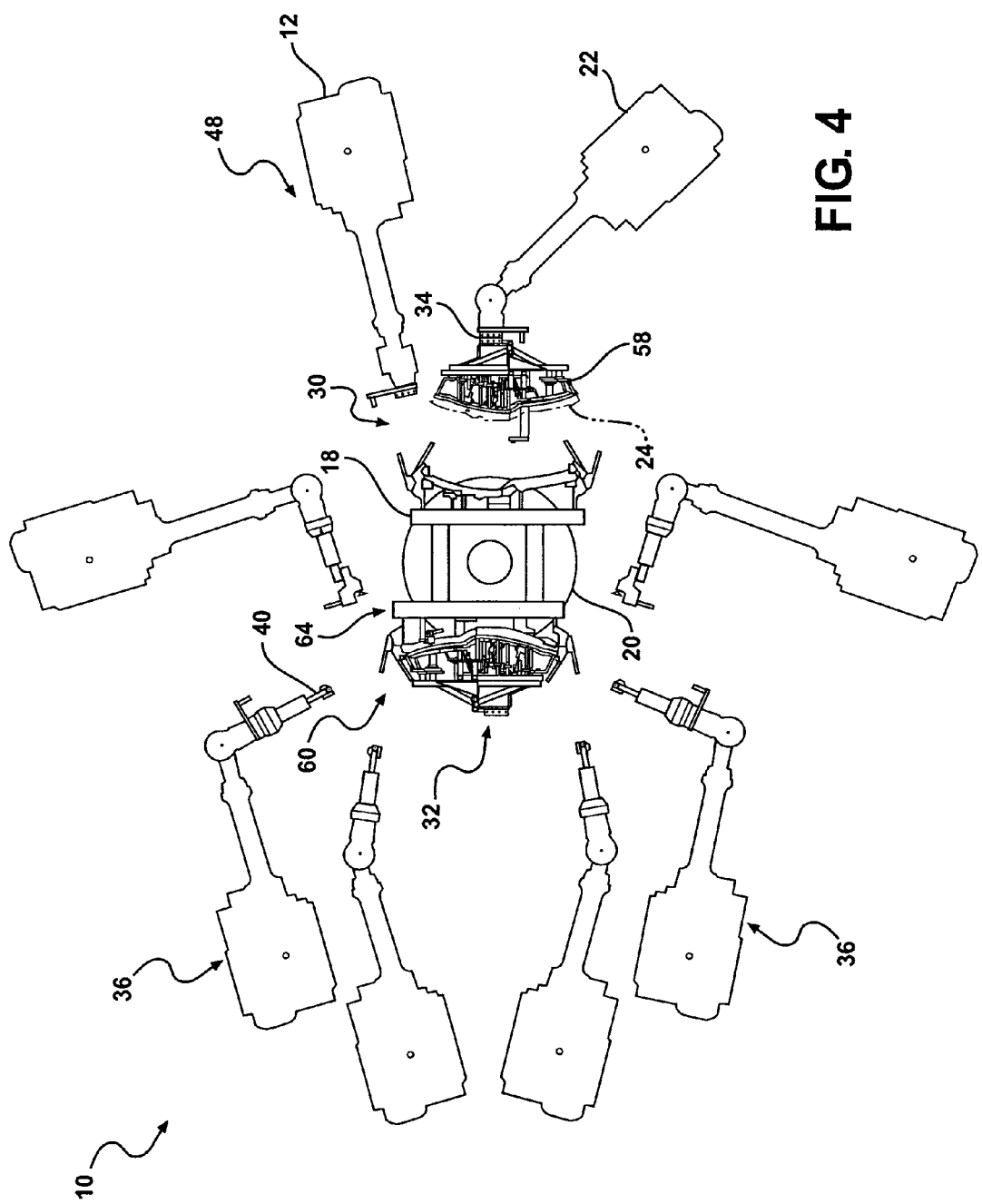
FIG. 4 is a schematic view of a hemming workstation including a turntable frame on which an anvil, clamping spider, and nested metal panels are mounted.
Figure 5:
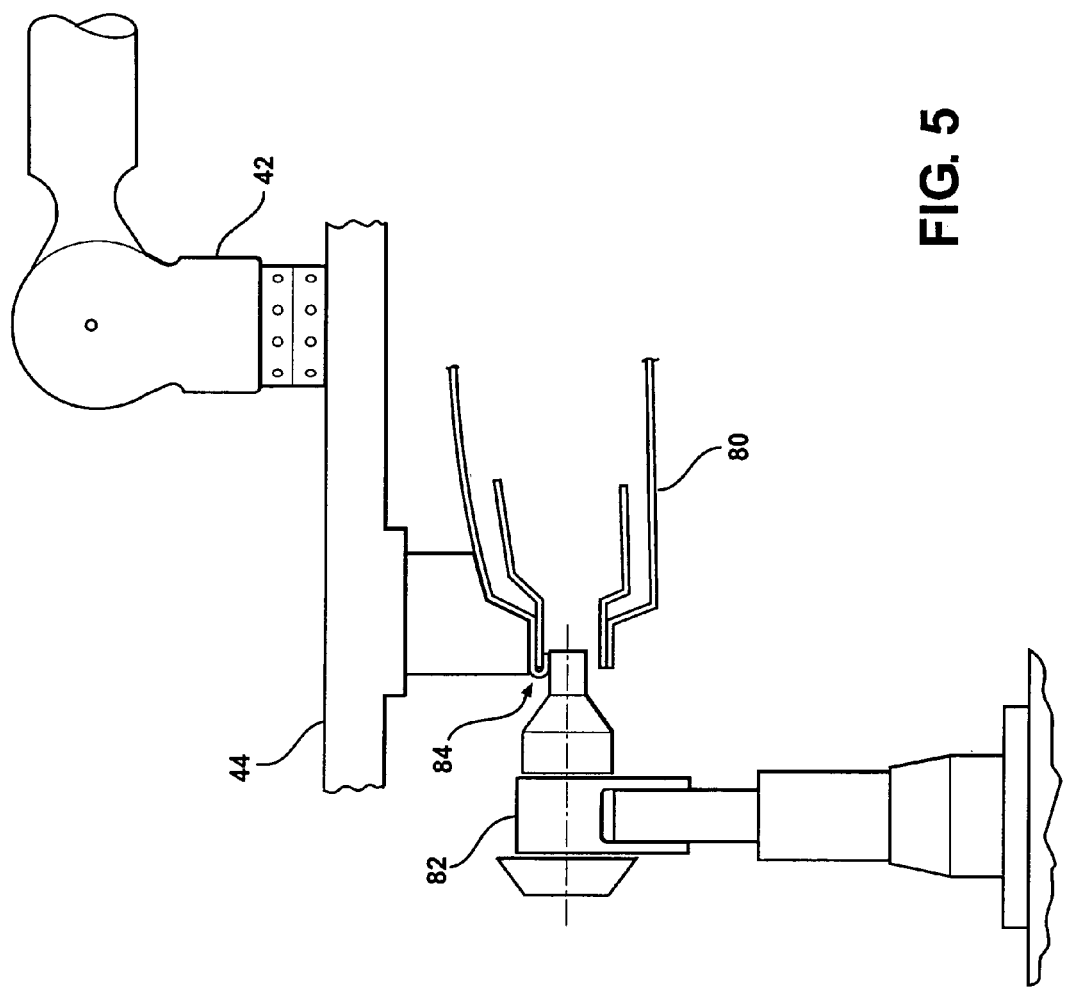
FIG. 5 is a perspective view of an unload robot performing localized hemming operations on a nested panel assembly using a pedestal mounted roller hemming head.

With reference to FIGS. 1 through 5, in a specific embodiment, a roller hemming system 10 in accordance with the invention includes an anvil load robot 12 such as a multi-axis robotic arm, and a plurality of anvil storage stands 14. Each anvil storage stand 14 holds at least one anvil 50. In the embodiment shown in the drawings, each anvil storage stand 14 may hold two anvils 50. Each anvil 50 may be product specific for hemming a specific type (i.e., door panel, hood panel, etc.) and model of closure panel assembly. The anvil load robot 12 includes a tool exchange end effector such as a tool exchanger 34 that allows the anvil load robot 12 to interchangeably pick and release the anvils 50. For example, the anvil load robot 12 may choose an anvil 50 from an anvil storage stand 14 by engaging the tool exchanger 34 with the anvil 50 on the stand 14. Once the tool exchanger 34 is engaged with the anvil 50, the anvil load robot 12 can release the anvil 50 from the stand 14 and manipulate the anvil 50 to other positions in the hemming system 48 as described in more detail below. To exchange the anvil 50, the anvil load robot 12 returns the engaged anvil to an empty position 52 on a stand 14, releases the engaged anvil, and chooses another anvil 50 from one of the stands 14 in the hemming system 48.

The anvil load robot 12 further uses the tool exchanger 34 to exchange the anvils 50 on a frame 18 that is mounted on a turntable 20. The frame 18 has a plurality of sides 56, and at least two of the sides are capable of receiving and mounting an anvil 50 thereon. The anvil load robot 12 secures an anvil 50 from one of the anvil storage stands 14 using the tool exchanger 34, manipulates the secured anvil 50 to the turntable frame 18, mounts the anvil 50 onto the turntable frame 18, and then releases the tool exchanger 34 from the anvil 50.

The hemming system 48 further includes a clamping spider load robot 22 such as a multi-axis robotic arm, and a plurality of clamping spider storage stands 26. Each clamping spider storage stand 26 holds at least one clamping spider 16 that can releasably hold a workpiece such as nested closure panels 24 and/or secure nested closure panels 24 to an anvil 50. Each clamping spider storage stand 26 may hold two clamping spiders 16. Each clamping spider 16 may be product specific for hemming a specific type and model of closure panel assembly (e.g., nested closure panels 24). The clamping spider load robot 22 may include a tool exchange end effector such as a tool exchanger 34 that allows the spider load robot 22 to interchangeably pick and release the clamping spiders 16. For example, the clamping spider load robot 22 may choose a clamping spider 16 from a stand 26 by engaging the tool exchanger 34 with the clamping spider 16 on the stand 26. Once the tool exchanger 34 is engaged with the clamping spider 16, the clamping spider load robot 22 can release the clamping spider 16 from the stand 26 and manipulate the clamping spider 16 to other positions in the hemming system 48 as described in more detail below. To exchange the clamping spider 16, the clamping spider load robot 22 returns the engaged clamping spider 58 to an empty position 52 on a stand 26, releases the clamping spider 16, and chooses another clamping spider 16 from one of the stands 26 in the hemming system 48.

A plurality of anvil storage stands 14 and a plurality of clamping spider storage stands 26 may be generally disposed in semi-circles 62. Also, a plurality of anvil storage stands 14 may be disposed generally opposite a plurality of spider storage stands 26.

A married assembly load robot 66 such as a multi-axis robotic arm introduces married assembly workpieces such as pairs of inner and outer nested closure panels 24 into the system. The married assembly load robot 66 cooperates with the clamping spider load robot 22 to secure the nested closure panels 24 to the clamping spider 16 held by the clamping spider load robot 22. Once the nested closure panels 24 are secured on the clamping spider 16, the clamping spider load robot 22 manipulates the clamping spider 16 and nested closure panels 24 towards an anvil 50 mounted on the turntable frame 18. The clamping spider load robot 22 aligns the clamping spider 16 and nested closure panels 24 with the anvil 50, and when the clamping spider 16 and nested closure panels 24 are in proximity with the anvil 50, the clamping mechanism 28 on the frame 18 secures the clamping spider 16 to the frame 18, thereby also mounting the nested closure panels 24 on the anvil 50. The clamping spider 16 engages the anvil 50 with register pins 68 and register surfaces 70 to accurately control the position of the clamping spider 16 in reference to the anvil 50. The inner panel and outer panel positions are controlled by engagement pins 72 and surfaces 74 on the anvil 50 and clamping spider 16 to accurately control part dimensional relationships during the hemming process.

The clamping spider load robot 22 then releases from the clamping spider 16 and moves away from the turntable frame 18. The clamping spider load robot 22 and the anvil load robot 12 then engage and activate the robot motion driven cornering units 76 to bend the hem flange in the corner areas of the part. The clamping spider load robot 22 and the anvil load robot 12 then move to a clear position for turntable 20 activation. The turntable 20 rotates to present the nested closure panels 24 for roller hemming with some or all of the corner pre-hems completed. For example, the turntable 20 may rotate 180 degrees to move the anvil 50, nested closure panels 24, and clamping spider 16 from a loading position 30 into a hemming position 32. When the anvil 50 and mounted nested closure panels 24 are rotated into the hemming position 32, the anvil 50 and nested closure panels 24 are accessible by a plurality of roller hemming robots 36 such as a plurality of multi-axis robotic arms that each include roller hemming end-of-arm tooling 40. For example, in the embodiment shown in the drawings, the hemming system 48 includes three hemming robots 36 that perform hemming along the outer periphery 38 of the nested closure panels 24 from the inside panel location of the assembly, and one hemming robot 36 that may perform hemming along inner portions of the nested closure panels 24 from the outside panel location of the assembly as necessary. The system in different embodiments allows up to two hemming robots 36 working on the outer panel side and up to four robots on the inner panel side of the assembly.

While the roller hemming robots 36 perform hemming operations on the nested closure panels 24, the clamping spider load robot 22 will unload a clamping spider 16 and hemmed panel assembly from the anvil 50 that is mounted on the turntable frame 18 180 degrees from the anvil 50 that is currently in the hemming position 32. The clamping spider load robot 22 first engages the clamping spider 16 and releases the clamping spider 16 from the anvil 50. The clamping spider load robot 22 then manipulates the clamping spider 16 and secured panel assembly and presents the panel assembly to an unload/pedestal hem robot 42 such as a multi-axis robotic arm. The unload/pedestal hem robot secures the panel assembly, and the clamping spider load robot 22 then releases the clamping spider 16 from the panel assembly.

At this time, the clamping spider load robot 22 may exchange the clamping spider 16 with another clamping spider stored on one of the clamping spider storage stands 26. The clamping spider load robot 22 returns the current clamping spider 16 to the clamping spider storage stands 26, releases the clamping spider 16, chooses another clamping spider from the storage stands 26, engages the new clamping spider, and removes the new clamping spider from the clamping spider storage stand 26.

In a similar manner, after the clamping spider load robot 22 has removed the clamping spider 16 and hemmed panel assembly from the turntable frame 18 as described in the preceding paragraph, the anvil load robot 12 may change the anvil 50 that is mounted on the turntable frame 18 180 degrees from the anvil 18 that is currently in the hemming position 32. The anvil load robot 12 engages the anvil 50, releases the anvil 50 from the turntable frame 18, returns the anvil 50 to the anvil storage stands 14, and chooses another anvil from the anvil storage stands 14.

The unload/pedestal hem robot 42 may include a robotic tool exchange end effector such as a tool exchanger 34 that allows the unload robot 42 to interchangeably pick and release clamping and localized hem anvil end effectors 44 that are stored on one or more storage stands 78. Similar to the clamping spider load robot 22, the unload robot 42 may pick and release clamping and localized hem anvil end effectors 42 from the clamping and localized hem anvil end effector storage stands 78. The unload robot 42 uses the clamping and localized hem anvil end effectors 44 to secure hemmed panel assemblies 80 that are passed to the unload robot 42 by the spider load robot 22 as described above. For example, the spider load robot 22 presents a hemmed panel assembly to the unload robot 42 as described above. The unload robot clamping and localized hem anvil end effectors 44 mounted on the tool exchanger 34 of the unload robot 42 grip the hemmed panel assembly 80, at which time the clamping spider 16 on the clamping spider load robot 22 releases the panel assembly 80.

When the unload robot 42 secures a panel assembly 80 with the clamping and localized hem anvil end effectors 44, the unload robot 42 may manipulate the clamping and localized hem anvil end effectors 42 and mounted panel assembly 80 towards a pedestal mounted roller hemming head 82. The unload robot 42 then positions the clamping and localized hem anvil end effectors 44 and panel assembly 80 relative to the pedestal mounted roller hemming head 82 and moves the clamping and localized hem anvil end effectors 44 and panel assembly 80 such that the pedestal mounted roller hemming head 82 performs localized hemming operations on a localized portion 84 of the panel assembly 80. After localized hemming operations are performed, the unload robot 42 releases the hemmed panel assembly 80 from the hemming system 48. For example, the unload robot 42 may place the hemmed panel assembly 80 on a part storage rack or similar (not shown).

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A method of hemming nested panels, said method comprising the steps of:

provides a single hemming workstation including a turntable adapted to simultaneously mount at least two anvils thereon at a first anvil mounting position and a second anvil mounting position;

mounting an anvil on said first anvil mounting position of said turntable using an anvil load robot;

mounting a clamping spider and an engaged set of nested panels on said anvil at said first anvil mounting position using a clamping spider load robot;

rotating said turntable to present said anvil and said mounted clamping spider and nested panels to a plurality of roller hemming robots;

performing hemming operations on said nested panels using said roller hemming robots; and while performing said hemming operations, performing at least one of (a) unloading a clamping spider and an engaged hemmed nested panel assembly from an anvil mounted on said second anvil mounting position of said turntable using said clamping spider load robot, (b) unloading an anvil from said second anvil mounting position using said anvil load robot, (c) mounting an anvil on said second anvil mounting position using said anvil load robot, and (d) mounting a clamping spider and an engaged set of nested panels onto an anvil disposed at said second anvil mounting position using said clamping spider load robot.

2. The method of claim 1, including storing at least one anvil on at least one anvil storage stand disposed in proximity to and within reaching distance of said anvil load robot.

3. The method of claim 1, including storing at least one clamping spider on at least one clamping spider storage stand disposed in proximity to and within reaching distance of said clamping spider load robot.

4. The method of claim 1, including loading a set of nested panels onto said clamping spider held by said clamping spider load robot using a panel load robot that engages said nested panels and presents said nested panels to said clamping spider load robot, wherein said nested panels are mounted on said clamping spider and released from said panel load robot.

5. The method of claim 1, including unloading a hemmed nested panel assembly from a clamping spider mounted on said clamping spider load robot using an unload robot, wherein said clamping spider load robot presents said hemmed nested panel assembly to said unload robot, said unload robot engages said hemmed nested panel assembly, and said clamping spider load robot releases said hemmed nested panel assembly.

6. The method of claim 5, wherein said unload robot manipulates said hemmed nested panel assembly relative to a pedestal mounted roller hemming head to perform localized hemming operations.

7. The method of claim 1, wherein hemming operations are simultaneously performed from a front side and a back side of said nested panels.

8. The method of claim 1, including the step of cornering on the load side of the turntable before rotating said turntable to present said panels for hemming.

* * * * *